(12) United States Patent
Ludwig

(10) Patent No.: US 7,365,465 B2
(45) Date of Patent: Apr. 29, 2008

(54) SECURING ASSEMBLY OF BANDAGES FOR SYNCHRONOUS MOTORS WITH OUTER PERMANENT MAGNETS

(75) Inventor: Felix Ludwig, Bad Kissingen (DE)

(73) Assignee: Siemens Aktiengesellschaft, München (DE)

( * ) Notice: Subject to any disclaimer, the term of this patent is extended or adjusted under 35 U.S.C. 154(b) by 805 days.

(21) Appl. No.: 10/403,555

(22) Filed: Mar. 31, 2003

(65) Prior Publication Data

US 2003/0193255 A1 Oct. 16, 2003

(30) Foreign Application Priority Data

Apr. 16, 2002 (DE) .............................. 102 16 856

(51) Int. Cl.
*H02K 1/28* (2006.01)
*H02K 21/14* (2006.01)

(52) U.S. Cl. .................... 310/156.12; 310/156.28; 310/156.29; 310/156.31; 310/271; 310/262

(58) Field of Classification Search .......... 310/156.08, 310/156.12, 156.27, 156.28, 156.29, 156.31, 310/271, 262
See application file for complete search history.

(56) References Cited

U.S. PATENT DOCUMENTS 4,674,178 A * 6/1987 Patel ........................... 29/598
4,746,827 A * 5/1988 Ochiai et al. ........... 310/156.22
5,345,669 A * 9/1994 Zigler et al. ................... 29/598

FOREIGN PATENT DOCUMENTS

| DE | 195 14 765 A1 | 4/1995 |
| JP | 05207689 A * | 8/1993 |
| WO | PCT/US86/01744 | 8/1986 |

OTHER PUBLICATIONS

Translation of Japanese Patent application No. HEI 5[1993]-207689.*

* cited by examiner

*Primary Examiner*—Karl Tamai
*Assistant Examiner*—David W. Scheuermann
(74) *Attorney, Agent, or Firm*—Henry M. Feiereisen; Ursula B. Day

(57) ABSTRACT

A rotor structure for an electric motor includes a cylindrical rotor core assembly and a plurality of permanent magnets disposed on an outer circumference of the rotor core assembly. Wrapped around the rotor core assembly is a bandage to secure the permanent magnets in place, wherein the bandage has a bandage edge arranged in proximity of an end surface of the rotor core assembly. In order to securely fix the bandage edge in place, a securing ring is disposed radially over the bandage edge of the bandage to hold the bandage against the rotor core assembly.

20 Claims, 1 Drawing Sheet

SECURING ASSEMBLY OF BANDAGES FOR SYNCHRONOUS MOTORS WITH OUTER PERMANENT MAGNETS

CROSS-REFERENCES TO RELATED APPLICATIONS

This application claims the priority of German Patent Application, Serial No. 102 16 856.3, filed Apr. 16, 2002, pursuant to 35 U.S.C. 119(a)-(d), the disclosure of which is incorporated herein by reference.

BACKGROUND OF THE INVENTION

The present invention relates, in general, to a rotor structure for an electric motor and to a method of manufacturing such a rotor structure.

Typically, an electric motor has a rotor structure with a cylindrical rotor core assembly having an end surface, a plurality of permanent magnets disposed on the outer circumference of the rotor core, and a bandage wrapped around the rotor core assembly to radially secure the permanent magnets on the outer circumference of the rotor core assembly. One end of the bandage is arranged in proximity of the end surface and should be carefully attached to the rotor to prevent a detachment from the rotor, when the rotor operates at high circumferential speeds, for example 170 m/s.

One approach to affix the end of the bandage to the circumference of the rotor involves the use of an adhesive tape to secure the bandage end and subsequently to apply an additional 1.5 layers of adhesive tape for added safeguard. The final fastening of the bandage is realized by soaking the bandage in epoxy resin and subsequent thermal curing.

However it has been shown that adhesive forces between the tape and subjacent layer or layers of the bandage are not always sufficient, so that the bandage end becomes detached. As a consequence of a detachment of the bandage end, contact may occur with the wall of the stator bore during operation of the motor, resulting not only in ultimate destruction of the bandage, but also in heating of the motor and grinding noises during motor operation. Moreover, the detachment of the tape or bandage may also lead in a loss of pre-tension by which the bandage has been assembled, so that the force with which the permanent magnets are affixed to the rotor core is reduced.

The detachment of the bandage end or the end windings of the tape results in all likelihood to the destruction of the bandage, or at least to an impairment and losses. As a large-scale production does not enable a test of the adhesive strength without destruction of the tape, the actual testing of proper securement of the bandage is limited to visual inspection. Therefore, it is of utmost importance to make sure that the end or ends of each bandage is/are securely attached.

It would therefore be desirable and advantageous to provide an improved method to obviate prior art shortcomings and to ensure a secure attachment of a bandage end for a rotor to outer permanent magnets.

SUMMARY OF THE INVENTION

According to one aspect of the present invention, a rotor structure for an electric motor includes a cylindrical rotor core assembly having an end surface, a plurality of permanent magnets disposed on an outer circumference of the rotor core assembly, a bandage wrapped around the rotor core assembly to secure the permanent magnets in place, with the bandage having a bandage edge arranged in proximity of the end surface of the rotor core assembly, and a securing ring disposed radially over the bandage edge of the bandage to hold the bandage against the rotor core assembly.

According to another feature of the present invention, there may be provided an end plate disposed on the end surface for securement of the permanent magnets in axial position upon the rotor core assembly. Suitably, the bandage edge of the bandage may be wound over an outer circumference of the end plate, with the securing ring placed over the bandage edge. The end plate may have a generally L-shaped configuration with an axial leg and a radial leg, wherein the bandage edge is wound over the axial leg.

According to another feature of the present invention, the securing ring may be shrunk onto the end plate to thereby fix the bandage edge between the securing ring and the end plate.

Suitably, both end surfaces of the rotor core assembly interact with such a securing ring and such an end plate for securing opposite bandage edges of the bandage to the rotor core assembly.

According to another feature of the present invention, the securing ring may have an outer diameter which is greater than a diameter of the rotor core assembly including the permanent magnets and the bandage.

According to another feature of the present invention, the bandage may be soaked with epoxy resin, with the epoxy resin then allowed to cure.

According to another aspect of the present invention, a method of making an rotor structure for an electric motor, includes the steps of providing a cylindrical rotor core assembly, placing a plurality of permanent magnets on an outer circumference of the rotor core assembly, wrapping a bandage about the rotor core assembly so as to secure the permanent magnets in place, and restraining an edge of the bandage by fitting a securing ring to an end face of the rotor core assembly.

As an alternative way of securing the bandage edge, it is also within the scope of the present invention to bend the bandage around the securing ring.

According to another feature of the present invention, the bandage edge may be secured upon the rotor core assembly by an adhesive tape before fitting the securing ring.

The present invention resolves prior art problems by improving the attachment of the bandage end upon the rotor core assembly. Quality variations, as experienced through conventional gluing processes to affix the bandage to the rotor core assembly can now be eliminated. Such variations are caused, for example, by contamination of the adhesive or by using too little or too much adhesive. Since, in accordance with the present invention, a securing ring is utilized, which essentially effects the securement of the bandage end, quality variations are of no concern in connection with the application of an adhesion process.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
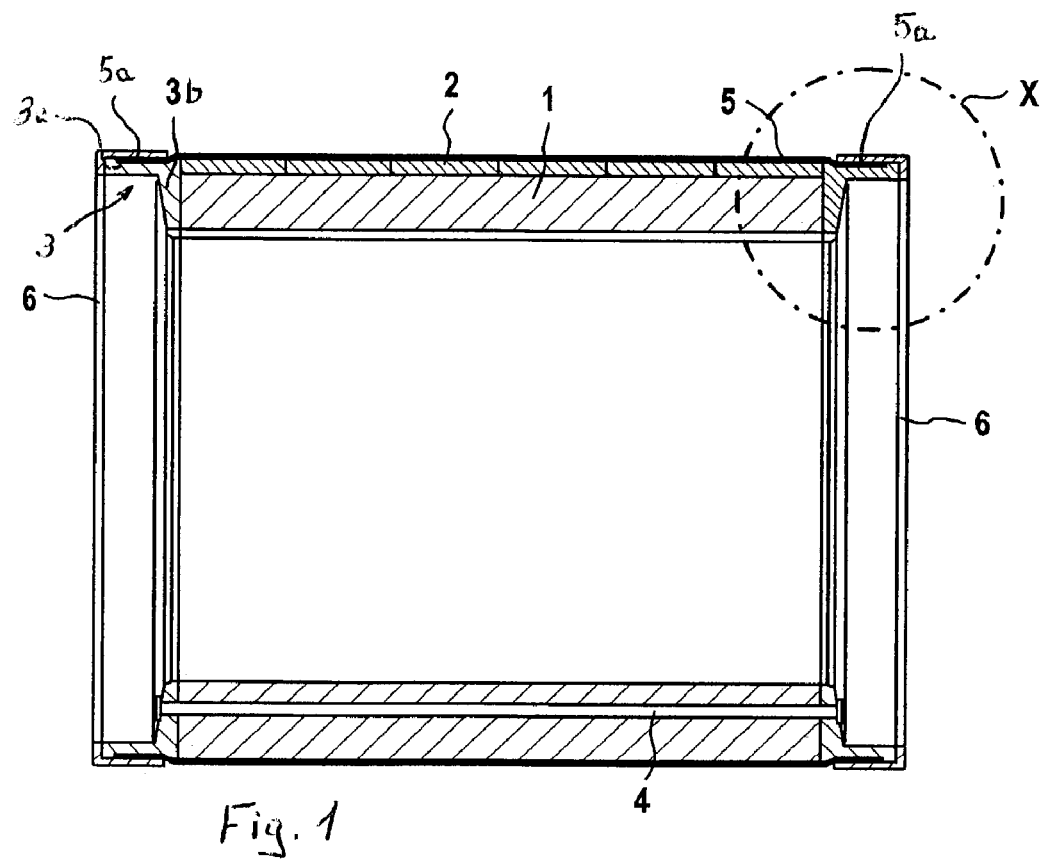
FIG. 1 shows a cross section of a rotor structure in accordance with the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a cross section of a rotor structure in accordance with the present invention, including a cylindrical rotor core 1 formed of a plurality of stacked laminations and having an outer circumference for supporting a plurality of permanent magnets 2. The rotor core 1 has opposite axial end surfaces and is provided with end plates 3, which are attached to the end surfaces to secure the axial position of the permanent magnets 2 on the outer circumference of the rotor core 1. A rod linkage 4 is provided to threadably engage the laminations of the rotor core 1 between the end plates 3. The end plates 3 have a generally L-shaped cross section with an axial leg 3a and a radial leg 3b, and have essentially a same outer diameter as the rotor core 1, including the permanent magnets 2, as clearly shown in FIG. 1a, which is an enlarged detailed cross sectional view of the area encircled in FIG. 1 and marked X. As a result, the axial position of the permanent magnets 2 on the rotor core 1 is secured.

The permanent magnets 2 are secured against the radially-acting centrifugal force by a bandage 5 which extends evenly across the permanent magnets 2. Beginning and ending of the bandage 5 and both edges 5a of the bandage 5 are respectively wound over the axial, ring-shaped leg 3a of the end plates 3, with a securing ring 6 being respectively shrunk onto the ring-shaped axial leg 3a of the end plates 3. Thus, the edge 5a of the bandage 5 is press-fitted between the end plate 3 and the securing ring 6 to prevent a detachment thereof during operation of the synchronous motor, e.g. at high rotation speeds.

Figure 1A:
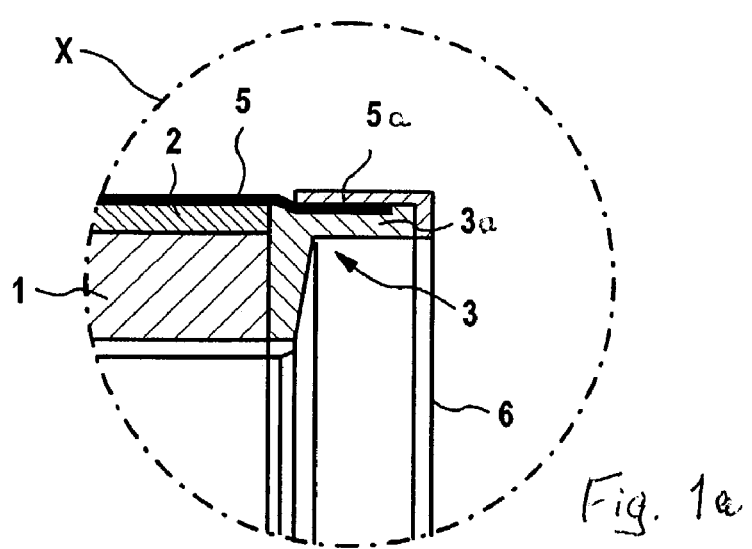
FIG. 1a is an enlarged detailed cross sectional view of the area encircled in FIG. 1 and marked X.

The securing ring 6 assists also as a guide, when the rotor is placed into a stator bore and prevents damage to the bandage 5 during placement because the outer diameter of the securing ring 6 is greater than the outer diameter of the laminated rotor core 1, including the permanent magnets 2 and the bandage 5, as is also clearly shown in FIG. 1a.

Suitably, the diameter of the axial ring-shaped leg 3a of the end plates 3 is slightly reduced in an area in which the securing ring 6 is shrunk-on, so that the securing ring 6 is prevented from extending out radially beyond the bandage 5 with its total material thickness, as clearly shown in FIG. 1a, i.e. the bandage edge of the bandage 5 slightly extends inwards in the area of the end plate 3 so that the securing ring 6 extends in alignment with the bandage 5.

During manufacture, the bandage end, after wrapping the bandage 5 around the rotor core 1, is affixed with an adhesive tape (not shown). The securing ring 6 is then immediately thereafter shrunk onto the edge 5a of the bandage 5. Subsequently, the bandage 5 is soaked with epoxy resin, which is then allowed to thermally cure. As a consequence of the shrunk-on securing rings 6, the bandage edge 5a is compressed with the underlying layers of the end windings of the bandage 5 and completely covered. Thus, a detachment of the bandage end of the bandage 5 and a destruction of the bandage 5 are positively prevented. In addition, process-based impacts can no longer affect the quality of affixation of the bandage ends. Furthermore, damage to the bandage ends can no longer occur during subsequent manufacturing steps, e.g., placement of the rotor into the stator bore, as described above, because the bandage edge 5a is concealed under the securing ring 6. This is also true for the other, beginning bandage end, even though it already has one or more layers of the bandage wound around it, but is still sensitive and now protected against damage.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A rotor structure for an electric motor, comprising:
   a cylindrical rotor core assembly having an end surface face;
   a plurality of permanent magnets disposed on an outer circumference of the rotor core assembly;
   a bandage wrapped around the rotor core assembly to secure the permanent magnets in place, said bandage having a bandage edge arranged in proximity of the end surface of the rotor core assembly;
   a securing ring disposed radially over the bandage edge such as to substantially extend flush with the bandage and to hold the bandage against the rotor core assembly; and
   an end plate disposed on the end surface for securement of the permanent magnets in axial position upon the rotor core assembly,
   wherein the bandage edge of the bandage is wound over an outer circumference of the end plate, with the securing ring placed over the bandage edge,
   wherein the end plate has a generally L-shaped configuration with an axial leg and a radial leg, wherein the bandage edge is wound over the axial leg.

2. A rotor structure for an electric motor, comprising:
   a cylindrical rotor core assembly having an end surface face;
   a plurality of permanent magnets disposed on an outer circumference of the rotor core assembly;
   a bandage wrapped around the rotor core assembly to secure the permanent magnets in place, said bandage having a bandage edge arranged in proximity of the end surface of the rotor core assembly;
   a securing ring disposed radially over the bandage edge such as to substantially extend flush with the bandage and to hold the bandage against the rotor core assembly; and
   an end plate disposed on the end surface for securement of the permanent magnets in axial position upon the rotor core assembly,
   wherein the bandage edge of the bandage is wound over an outer circumference of the end plate, with the securing ring placed over the bandage edge,
   wherein the securing ring is shrunk onto the end plate to thereby fix the bandage edge between the securing ring and the end plate.

3. The rotor structure of claim 1, and further comprising a further said securing ring and a further said end plate for attachment to another end surface of the rotor core assembly.

4. The rotor structure of claim 1, wherein the securing ring has an outer diameter which is greater than a diameter of the rotor core assembly including the permanent magnets and the bandage.

5. The rotor structure of claim 1, wherein the bandage is soaked with epoxy resin and the epoxy resin is cured.

6. The rotor structure of claim 1, wherein the bandage is bent around the securing ring to secure the bandage edge.

7. A rotor structure for an electric motor, comprising:
   a cylindrical rotor core assembly having an end surface face;
   a plurality of permanent magnets disposed on an outer circumference of the rotor core assembly;
   a bandage wrapped around the rotor core assembly to secure the permanent magnets in place, said bandage having a bandage edge arranged in proximity of the end surface of the rotor core assembly;
   a securing ring disposed radially over the bandage edge such as to substantially extend flush with the bandage and to hold the bandage against the rotor core assembly; and
   an end plate disposed on the end surface for securement of the permanent magnets in axial position upon the rotor core assembly, wherein the end plate is inwardly recessed so that the bandage edge of the bandage slightly extends inwards and the securing ring extends in alignment with the bandage.

8. A rotor structure for an electric motor, comprising:
   a cylindrical rotor core assembly having an end surface face;
   a plurality of permanent magnets disposed on an outer circumference of the rotor core assembly;
   bandage wrapped around the rotor core assembly to secure the permanent magnets in place, said bandage having a bandage edge arranged in proximity of the end surface of the rotor core assembly;
   a securing ring disposed radially over the bandage edge such as to substantially extend flush with the bandage and to hold the bandage against the rotor core assembly; and
   an end plate disposed on the end surface for securement of the permanent magnets in axial position upon the rotor core assembly,
   wherein the bandage edge is retained between the end plate and the securing ring.

9. The rotor structure of claim 2, and further comprising a further said securing ring and a further said end plate for attachment to another end surface of the rotor core assembly.

10. The rotor structure of claim 2, wherein the securing ring has an outer diameter which is greater than a diameter of the rotor core assembly including the permanent magnets and the bandage.

11. The rotor structure of claim 2, wherein the bandage is soaked with epoxy resin and the epoxy resin is cured.

12. The rotor structure of claim 2, wherein the bandage is bent around the securing ring to secure the bandage edge.

13. The rotor structure of claim 7, and further comprising a further said securing ring and a further said end plate for attachment to another end surface of the rotor core assembly.

14. The rotor structure of claim 7, wherein the securing ring has an outer diameter which is greater than a diameter of the rotor core assembly including the permanent magnets and the bandage.

15. The rotor structure of claim 7, wherein the bandage is soaked with epoxy resin and the epoxy resin is cured.

16. The rotor structure of claim 7, wherein the bandage is bent around the securing ring to secure the bandage edge.

17. The rotor structure of claim 8, and further comprising a further said securing ring and a further said end plate for attachment to another end surface of the rotor core assembly.

18. The rotor structure of claim 8, wherein the securing ring has an outer diameter which is greater than a diameter of the rotor core assembly including the permanent magnets and the bandage.

19. The rotor structure of claim 8, wherein the bandage is soaked with epoxy resin and the epoxy resin is cured.

20. The rotor structure of claim 8, wherein the bandage is bent around the securing ring to secure the bandage edge.

* * * * *